Aug. 14, 1928. Re. 17,065
N. L. DAUPLAISE
POWER STOPPING DEVICE
Original Filed March 7, 1924 2 Sheets-Sheet 1
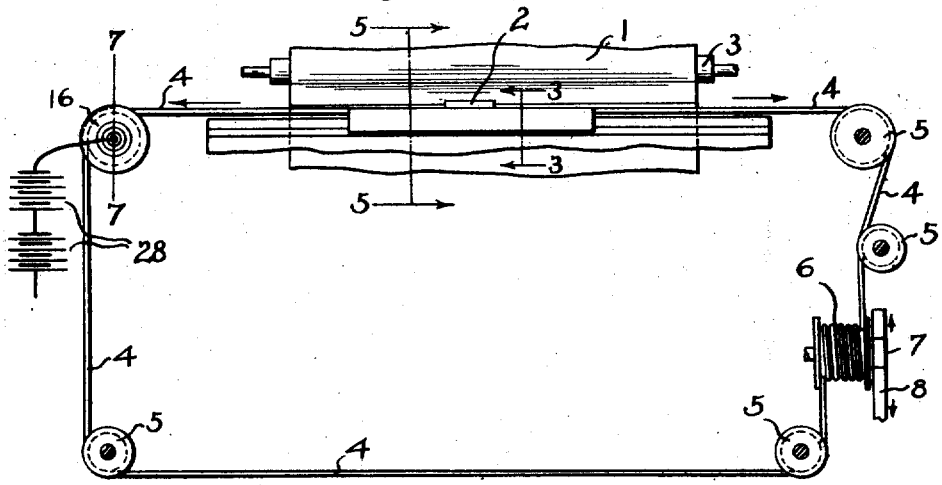
Fig. 1.
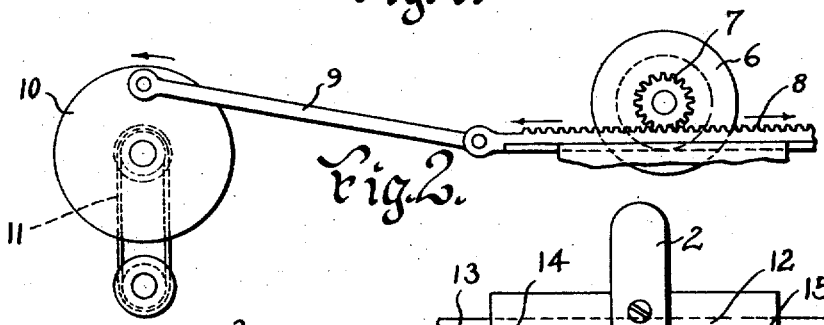
Fig. 2.
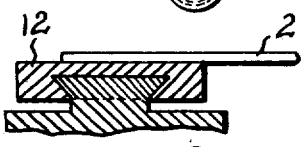
Fig. 3.
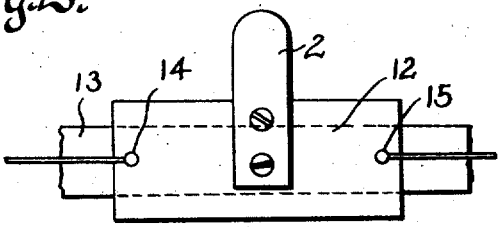
Fig. 4.
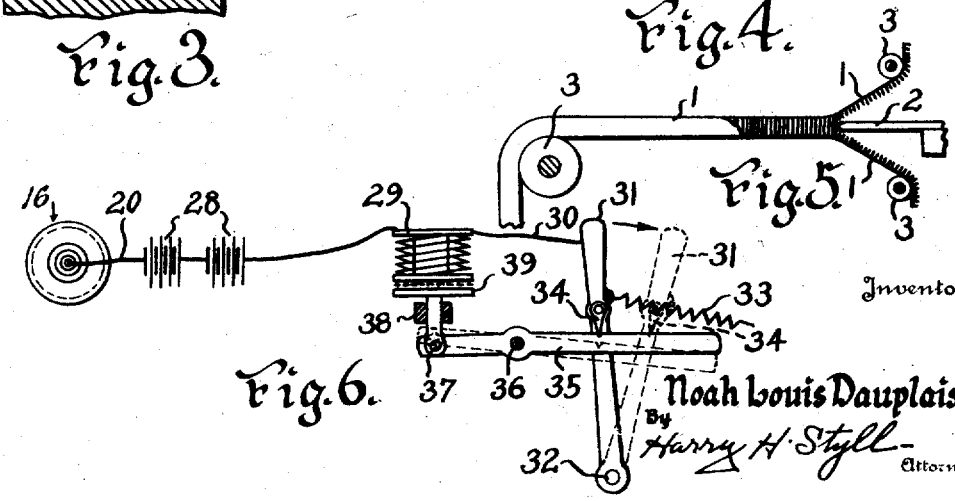
Fig. 5.
Fig. 6.
Inventor
Noah Louis Dauplaise.
By Harry H. Stull
Attorney Aug. 14, 1928. Re. 17,065

N. L. DAUPLAISE

POWER STOPPING DEVICE

Original Filed March 7, 1924 2 Sheets-Sheet 2

Inventor

Noah Louis Dauplaise

By Harry H. Styll

Attorney

Reissued Aug. 14, 1928. Re. 17,065

UNITED STATES PATENT OFFICE.

NOAH LOUIS DAUPLAISE, OF SOUTH MANCHESTER, CONNECTICUT, ASSIGNOR TO NELSON L. JARVIS, OF PALMER, MASSACHUSETTS.

POWER-STOPPING DEVICE.

Original No. 1,558,595, dated October 27, 1925, Serial No. 697,681, filed March 7, 1924. Application for re'ssue filed October 20, 1927. Serial No. 227,596.

This invention relates to power throw out devices, and more specifically to an electric power throw out device for looms and machines having feed arrangements, such as velvet making machines, machine tools, weaving and cloth making machines generally.

The principal object of this invention is the provision of automatic means that will stop the machine, and particularly the feed arrangements of the machine should the feed become jammed, stalled, or over-loaded in any way.

A further object of the invention is the provision of means whereby an electric circuit is established and the power of the machine thrown off when the feed becomes overloaded, stalled, or otherwise inoperative.

Another object of the invention is the provision of means operated by the centrifugal action of the feeding means, that will permit the power of the machine to operate as long as the centrifugal means are thrown away from the center by the action of the moving part, but will stop the power of the machine when the centrifugal means are slowed up or stopped, allowing the part operated by the centrifugal force or movement of the centrifugal means to fall towards the center.

Other objects and advantages of the invention should be readily apparent by reference to the following specification taken in connection with the accompanying drawings, and it will be understood that any modifications or departures may be made from the specific features disclosed within the scope of the claims without departing from or exceeding the spirit of the invention, a preferred form only of the device being shown for sake of and by way of illustration.

Figure 1 is a diagrammatic elevation showing the invention attached to the knife feeding arrangement of a velvet making machine.

Figure 2 shows an end elevation of the means for oscillating the knife feeding arrangements of Figure 1.

Figure 3 is a cross section on line 3—3 of Figure 1 showing the knife and the slide to which the knife is attached.

Figure 4 is a top view of Figure 3 showing the attachment of the knife and the attachment of the oscillating cords to the knife slides.

Figure 5 is a section on line 5—5 of Figure 1, showing the method of splitting the velvet by means of the knife.

Figure 6 is a diagrammatic elevation showing the arrangement of the electric circuit attaching the invention to the power lever of the machine.

Figure 8:
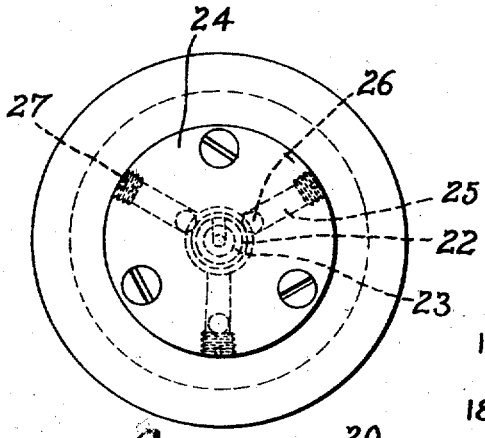
Figure 8 is an end view of Figure 7 showing the right hand end.

Referring to the drawings, the velvet or cloth 1 is split in two pieces, as shown in Figure 5, by the knife 2. The cloth 1 is advanced against the edge of the knife 2 by means of the loom mechanism drawing the cloth over the several rollers 3. The knife is oscillated back and forth along the split edge of the velvet as indicated by the arrows in Figure 1. This oscillation is obtained through a cord or belt 4 being oscillated back and forth over rollers 5 by means of an oscillating drum 6 having a spur wheel 7 on the end thereof intermeshing with a rack 8 driven by a link or connecting rod 9 attached to the drum 10 which is rotated by the belt 11, Figure 2. The knife 2 is attached to the knife slide 12 which slides on the guide 13 through the action of the oscillating belt 4, which is attached to the slide at 14 and 15. The edge of the knife 2 is made and kept very sharp and the velvet is cut by the oscillation of this knife back and forth across its split edge, as shown in Figure 5.

Figure 7:
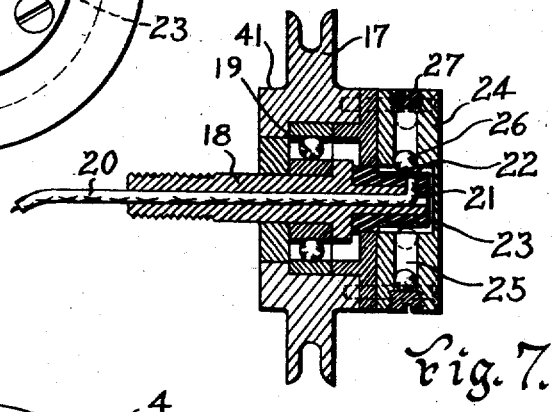
Figure 7 is a cross section on line 7—7 of Figure 1 showing a detailed arrangement of the electric circuit making and breaking means.
Figure 9:
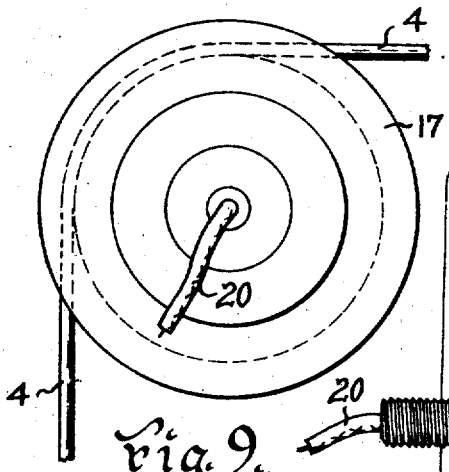
Figure 9 is an end view of Figure 7 showing the left hand end.
Figure 10:
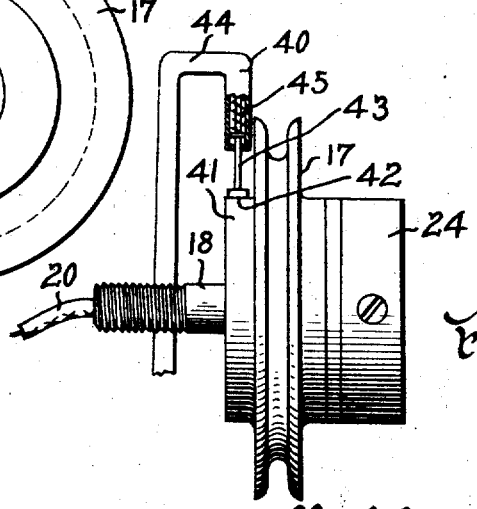
Figure 10 is a side elevation of Figure 7.

In the present instance my invention is applied to one of the idler wheels 5 and given the number 16 in Figure 1, shown in detail in cross section in Figure 7. This idler wheel consists of the belt drum 17 mounted on the shaft 18 on ball bearings 19. Through the center of the shaft 18 is laid an insulated electric wire 20 having its end 21 turned over in contact with a brass bushing 22, this brass bushing lying on a fiber insulation bushing 23 on the end of the shaft 18.

There is a cap 24 over the end of the shaft having in it channels or race ways 25 in which balls 26 are located, and of such a diameter that they may travel back and forth freely in the channel 25. Access to these balls is provided by cap screws 27.

The insulated wire 20 is connected with a source of electric power, such as electric batteries 28, Figure 6, and to the solenoid 29, and the solenoid to the machine by the wire 30, Figure 6; the other lead of the circuit is through the machine, the wheel 16 being mounted on the machine. The power of the machine is turned on or taken off by means of the power handle 31, which is pivoted at 32 and is under normal pressure of the spring 33 to put it in position to throw off the power if it is not held by some other positive force. On the lever 31 is a clip or stop 34 which engages a notch in a lever 35 pivoted at 36. Connected to the end of the lever 36 is a rod 37 capable of sliding in bearings 38 and having a contact plate 39 on the end thereof. When the contact plate 39 is drawn up by the magnetic action of the solenoid the outer end of the lever 35 which contacts with the power handle 31 is dropped down, as indicated in dotted lines in Figure 6. This releases the catch 34 and the handle 31 is pulled back to off power position by means of action of the spring 33, thus stopping the power of the machine.

The electric circuit operating the handle 31 is closed through the action of the balls 26 coming in contact with the brass sleeve 22. When the drum 17 is oscillated back and forth by the belt or cords 4, as described, the balls 26 are thrown out to the outermost position in the slot 25, in fact thrown out until they contact with the cap screw 27, as indicated in dotted lines in Figure 7. This, of course, breaks the electric circuit. Should, however, the belt or cord 4 be broken for any reason, or should the velvet jam up on the edge of the knife and clog, slowing down the oscillation of the cord or belt 4, the drum 17 will pause in its oscillatory action and one or more of the balls 26 will drop down in contact with the brass sleeve 22, thus completing the electric circuit, through the machine, which will cause the contact plate 39 to be drawn up to the solenoid, lift up the inner end of the lever 35, drop down the outer end thereof, and allow the power handle 31 to be dropped back into power throw off position through means of the spring 33, thus shutting off the power and preventing the velvet from being thrown up against the edge of the knife, and becoming cut, damaged, or destroyed. The handle or lever 31 controls the power of the machine, which draws the cloth over the rollers 3 and oscillates the knife 2 against the split edge of the velvet. This power handle or lever is spring impelled towards the position which shuts off the power of the machine shown in dotted lines in Figure 6. The position shown in full lines in Figure 6, shows the power lever in its position when the power is turned on the machine, and it is held in this position by the clip or pawl 34, which is released by the solenoid mechanism when the mechanism for oscillating the knife against the edge of the cloth is stopped through being jammed. When the solenoid releases the handle 31 it returns to the off power position indicated in dotted lines, thereby shutting off the power, exactly the same as though it were drawn over there by hand.

From the foregoing it will be seen that as long as the feed drum 17 is in action through rotating or oscillating the balls 26 are at the outermost ends of the slots 25 and the power of the machine is not interrupted and the feed of the cloth or velvet is continuous against the edge of the knife, but when the drum 17 pauses in its action the balls drop down, making an electric contact, which through the action of the solenoid, throws off the power handle and shuts off the machine, preventing further destruction of the cloth or other object that is being fed to the machine. The wheel member 16 is constantly oscillated back and forth by the belt 4 which carries the knife back and forth across the edge of the cloth. The oscillation is so rapid that there is not sufficient pause in the member 16 at its time of change of direction to allow the balls to drop down and form the contact. The wheel 16 is rapidly oscillated back and forth by the belt 4 making about a quarter turn in each oscillation.

In order to facilitate the stopping of the feed drum 17 quickly, to insure the dropping down almost instantly of the balls 26 to make the electric contact, a brake 40 may be applied to the flange 41 of the feed drum 17. This brake consists of a brake shoe 42 in contact with the flange 41, being supported by a rod 43 supported by the bracket 44, and pressed against the flange 41 by the action of the springs 45 held in a suitable recess in the bracket 44. If the belt 4 is broken or comes off the drum 17 the brake 40 brings the drum 17 to almost instantaneous rest, allowing the balls 26 to drop down and contact with the brass plate 22 thereby shutting off the power of the machine.

From the foregoing it will be seen that the invention consists in a very simple arrangement inserted in the feeding device of a power machine and so arranged that it will automatically throw off the power and stop the machine in case of overload, damage or interruption to the feed of the machine, and that it is particularly applicable to a weaving machine, machine tools and devices of that general character, or in any place where articles in course of manufacture are being fed to the machine which produces them, or which is operating upon them.

I claim:

1. In a machine of the character described, means for applying power to the machine, a lever for shutting off and turning on the power, yielding means adapted to urge the power lever towards off power position, a pivoted lever engaging the power lever to hold it in on power position, a solenoid engaging one end of the pivoted lever, an idler wheel having an electric circuit therein and a separated portion and a freely movable metal member adapted to close the space in the circuit by gravity to energize the solenoid to operate the pivoted lever to release the power lever and throw it to an off power position and to move away from the separated portion of the circuit by centrifugal action when the idler wheel is moving when the power lever is in on power position.

2. In a machine of the character described, means for feeding the cloth, a knife for splitting the cloth, means for oscillating the knife back and forth against the edge of the cloth, an idler wheel in the oscillating means having an electric circuit therein, having a separated portion, a race-way in the wheel communicating with the separated portion of the circuit, a freely movable metal piece in the race-way adapted to close over the separated portion of the circuit by gravity when the wheel is at rest and to move away from the separated portion of the circuit by centrifugal action when the wheel is in motion through the knife oscillating means, said circuit being connected to the power control of the machine through a solenoid which is adapted to shut off the power of the machine when the motion of the knife oscillating means is stopped.

3. In a machine of the character described, means for feeding the cloth, a knife for splitting the cloth, means for oscillating the knife back and forth against the edge of the cloth, an idler wheel in the oscillating means having an electric circuit therein, having a separated portion, a race-way in the wheel communicating with the separated portion of the circuit, a freely movable metal piece in the race-way adapted to close over the separated portion of the circuit by gravity when the wheel is at rest and to move away from the separated portion of the circuit by centrifugal action when the wheel is in motion through the knife oscillating means, said circuit being connected to the power control of the machine through a solenoid which is adapted to shut off the power of the machine when the motion of the knife oscillating means is stopped, and a friction brake engaging the idler wheel adapted to hold it against motion on its axle when the knife oscillating means is broken or suddenly removed while in motion.

4. In a device of the character described, power means for advancing a fabric, a knife for splitting the fabric, means for reciprocating the knife against the fabric, an electric circuit between the power means and the reciprocating means, a movable member actuated by the reciprocating means and united with the two leads of the circuit to leave a gap between them, a loose metal member in the movable member adapted to rest on the ends of the circuit leads and close the circuit when the movable member is at rest and to move away from the circuit leads and break the circuit when the movable member is actuated by the reciprocating means, and means operated by the circuit to stop the power means when the circuit is closed.

5. In a device of the character described, power means for advancing a fabric, means for throwing on and off the power, a knife for splitting the fabric, means for reciprocating the knife against the fabric, an electric circuit between the power means and reciprocating means, electro-magnetic means in the circuit, a movable member actuated by the reciprocating means and united with the two leads of the circuit to leave a gap between them, a loose metal member in the movable member adapted to rest on the ends of the circuit leads and close the circuit when the movable member is at rest to energize the electro-magnetic means to throw off the power means and to move away from the circuit leads and break the circuit when the movable member is actuated by the reciprocating means.

6. In a device of the character described for use in combination with a power operated machine, means for controlling the power of the machine to turn on or shut off the power thereto, means for holding the power control means in on-power position, electrically operated means adapted to operate said means to shut off the power, an electric circuit connected with the electrically operated means and having a separated portion therein interrupting the circuit, a movable electric conducting member adapted to close the space in the circuit, movable positioning means adapted to regulate the position of the movable conducting member with respect to the space in the circuit, and movable operating means engaging the positioning means to control the position of the conducting member, said conducting member being removed from the space in the circuit when the movable operating means is operating the positioning means, and electrically closing the space when the movable operating means is out of operative engagement with the positioning means.

7. In a device of the character described for use in combination with a power operated machine, means for controlling the power of the machine to turn on or shut off the power thereto, means for holding the power control means in on-power position, a solenoid adapted to release said means to shut off the power when the solenoid is energized, an electric circuit connected with the solenoid to energize the same when the circuit is closed and having a separated portion therein interrupting the circuit, a movable electric conducting member adapted to close the space in the circuit to complete the circuit, a rotatable wheel-like member adapted to regulate the position of the movable conducting member with respect to the space in the circuit and a movable belt-like member engaging the wheel-like member to control the position of the conducting member, said conducting member being removed from the space in the circuit when the moving belt-like member is operating the wheel-like member, and electrically closing the space when the belt-like member is out of engagement with the wheel-like member.

8. In a device of the character described for use in combination with a power operated machine, pivoted means for controlling the power of the machine to turn on or shut off the power thereto, latch means for holding the pivoted power control in on-power position, a solenoid adapted to release the latch means to shut off the power when the solenoid is energized, an electric circuit connected with the solenoid to energize the same when the circuit is closed and having a separated portion therein interrupting the circuit, a movable electric conducting member adapted to close the space in the circuit to complete the electric circuit, a rotatable wheel adapted to regulate the position of the conducting member in relation to the space in the circuit and a movable belt-like member engaging the periphery of the wheel to control the position of the conducting member, said conducting member being removed from the space in the circuit when the moving belt-like member is engaging the periphery of the wheel and electrically closing the said space when the belt-like member is out of engagement with the periphery of the wheel.

9. In a device of the character described for use in combination with a power operated machine, means for controlling the power of the machine to turn on or shut off the power thereto, means for holding the power control means in on-power position, a solenoid adapted to release said means to shut off the power when the solenoid is energized, an electric circuit connected with the solenoid to energize the same when the circuit is closed and having a separated portion therein interrupting the circuit, a movable electric conducting member adapted to close the space in the circuit to complete the electric circuit, a rotatable member adapted to regulate the position of the movable conducting member with respect to the space in the circuit, and a movable member engaging the rotatable member to control the position of the conducting member said conducting member being removed from the space in the circuit when the moving movable member is engaging the rotatable member and electrically closing the space when the moving movable member is out of engagement with the rotatable member.

In testimony whereof I have affixed my signature.

NOAH LOUIS DAUPLAISE.